United States Patent [19]

Mendehall

[11] 4,326,809
[45] Apr. 27, 1982

[54] RECYCLING APPARATUS FOR ASPHALTIC CONCRETE

[76] Inventor: Robert L. Mendehall, 1770 Industrial Rd., Las Vegas, Nev. 89102

[21] Appl. No.: 139,640

[22] Filed: Apr. 14, 1980

Related U.S. Application Data

[63] Continuation-in-part of Ser. No. 871,351, Jan. 23, 1978, and Ser. No. 906,734, May 17, 1978.

[51] Int. Cl.³ ............................ B28C 5/42; B28C 5/46
[52] U.S. Cl. ............................................ 366/4; 366/7; 366/25; 366/57; 366/228; 432/72; 432/105
[58] Field of Search ...................... 366/4, 5, 7, 11, 12, 366/21, 24, 25, 52, 57, 58, 187, 188, 192, 193, 225, 228, 184; 193/10; 432/72, 73, 105; 126/343.5 A; 99/473, 480, 481

[56] References Cited

U.S. PATENT DOCUMENTS

| | | | |
|---|---|---|---|
| 964,512 | 7/1910 | Handle | 366/21 |
| 1,056,249 | 3/1913 | Bathrick | 366/68 |
| 1,067,180 | 7/1913 | Levally | 366/52 |
| 2,952,452 | 9/1960 | Kopf | 99/473 |
| 4,130,364 | 12/1978 | Brown | 366/57 |
| 4,136,965 | 1/1979 | Sunnergren et al. | 366/228 |
| 4,143,972 | 3/1979 | Benson | 366/25 |

*Primary Examiner*—Philip R. Coe
*Assistant Examiner*—Timothy F. Simone
*Attorney, Agent, or Firm*—Seiler & Quirk

[57] ABSTRACT

An improved apparatus for recycling asphaltic concrete comprises a rotatable drum having a first port at one end open to atmosphere, a burner adjacent the first end, a second port at a second end of the drum with means for closing the second port, means for recovering the composition from the second port and whereby the closure means and composition recovery means at the second port cooperate to maintain the second port closed except to the extent necessary to recover composition.

15 Claims, 6 Drawing Figures

RECYCLING APPARATUS FOR ASPHALTIC CONCRETE

This application is a continuation-in-part of my co-pending applications Ser. Nos. 871,351, filed Jan. 23, 1978 and 906,734, filed May 17, 1978.

BACKGROUND OF THE INVENTION

Although a number of different types of apparatus have been proposed for recycling asphaltic concrete, for example, U.S. Pat. Nos. 3,674,242, 4,130,364, and 4,075,710, such equipment is relatively inefficient, and presents significant problems of venting substantial amounts of volatile asphalt materials and smoke directly to atmosphere. Because of these problems, in most, if not substantially all of such prior art apparatus, 100% asphaltic concrete is not recycled, and instead, substantial amounts of aggregate are introduced and heated at the hot end of the drum, prior to introducing the recycle material downstream in a cooler portion.

In my prior co-pending applications there are disclosed apparatus for recycling asphaltic concrete in which flame and hot gases of combustion are introduced into an open port at one end of the drum, asphaltic hydrocarbons in the drum are burned, and the exhaust gases from the drum are vented to atmosphere substantially only through that same open port. Moreover, the relatively short drum offers advantages over longer state of the art drums having an area along the drum length, opposite the burner, in which only a minor amount of composition heating occurs. The present apparatus is designed to take advantage of the concepts of my improved apparatus for relatively large scale continuous recycling.

SUMMARY OF THE INVENTION

The apparatus of the present invention is designed to take advantage of the apparatus of my aforesaid co-pending applications, including both the advantage of burning volatile asphaltic hydrocarbons within the drum and venting the hydrocarbon combustion products and exhaust gases to atmosphere through the same port and at the same time that flame and hot gases of combustion are introduced into the drum. The apparatus also utilizes a substantial length of the drum for directly heating the recycle composition. These advantages are contrasted with the prior art recycle apparatus in which the hot gases are introduced at one end, simply flow through the entire length of the drum and are exhausted at the substantially cooler opposite end. These as well as other advantages will be evident from the following detailed description.

DETAILED DESCRIPTION OF THE INVENTION

Figure 1:
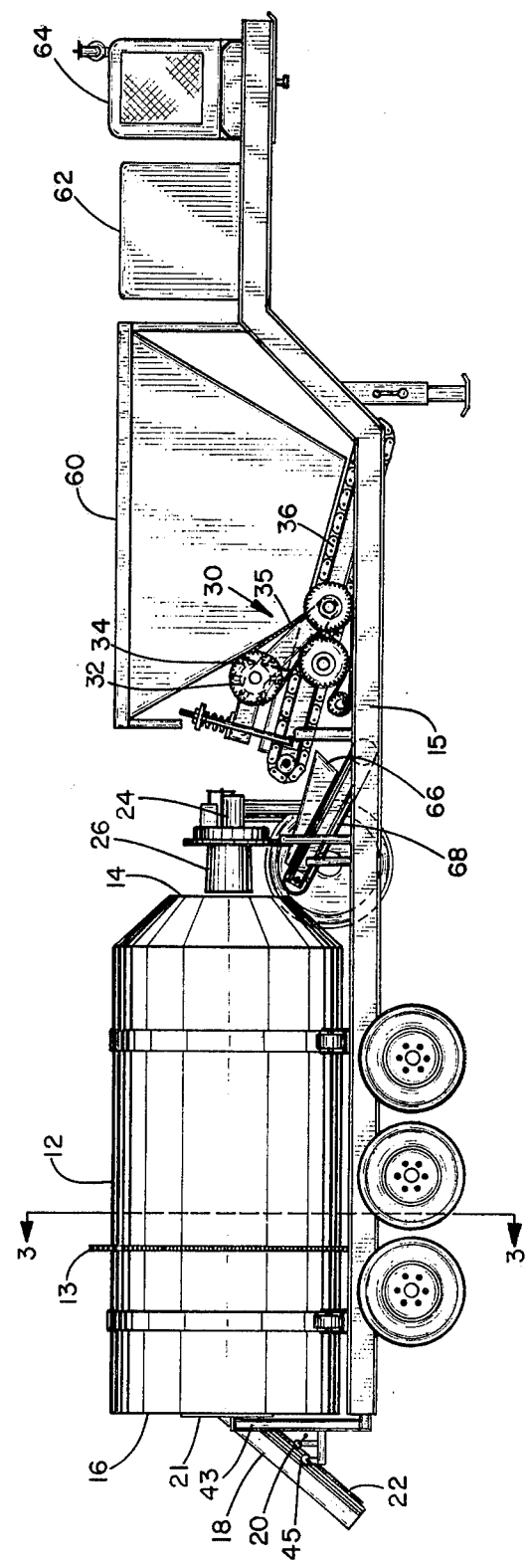
FIG. 1 is a side view of the apparatus of the invention including the drum, and an improved crushing and feed apparatus.

As shown in FIG. 1, the apparatus consists of a drum 12 mounted on a suitable frame 15, and having means for rotating the drum, including a motor (not shown) for driving appropriate gears, and/or chain and which engage circumferential sprocket 13. Thus, the drum is rotated along an axis extending between open front port 14 and back plate 16. Any suitable means for rotating the drum may be used, with that shown being for illustration only. A fuel tank 62 and generator for operating the drum motor and the crushing and feeding apparatus are also secured on the frame. Moreover, the frame 15 may be mounted on wheels as shown, with suitable means for being attached to a truck or the like, for pulling the apparatus from location to location.

The drum includes a port 14, open to atmosphere, and which port is preferably somewhat restricted relative to the largest diameter of the interior of the drum. The port is also preferentially circular, with the axis of drum rotation extending through the center of the circular port, i.e., at its radius. This port restriction offers the advantage of allowing a larger load of composition to be treated within the drum without having to tilt the drum substantially from horizontal to prevent the composition from overflowing. Another advantage is realized in that the somewhat restricted port also provides a protection in the form of a screen or shield for the interior of the drum from being susceptible to exterior drafts of wind. This latter effect may be important, particularly where the apparatus is used under windy conditions, where without such a restriction, gases within the drum, including the asphaltic hydrocarbon volatiles might be directly vented to atmosphere without having been burned. The restriction also acts to increase or build up the gas temperatures within the drum.

Figure 3:
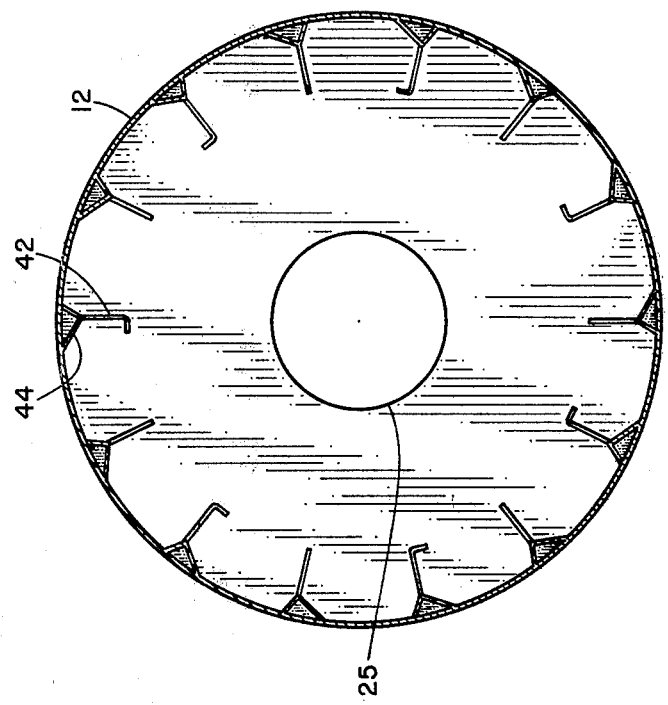
FIG. 3 is a interior sectional view of the drum taken along lines 3—3 of FIG. 1.
Figure 2:
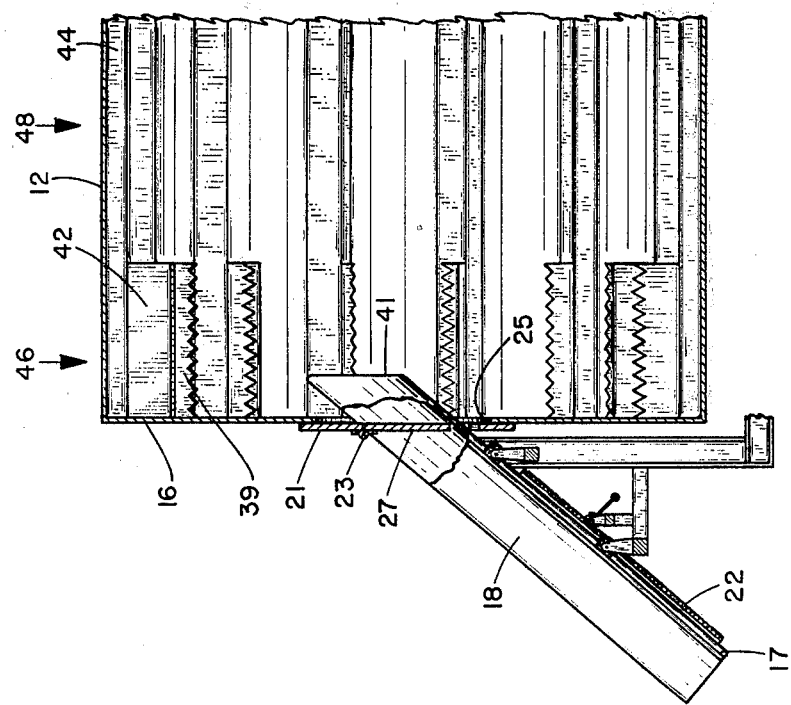
FIG. 2 is a partial sectional view of the closed drum end, at which composition is recovered.

Noting also FIGS. 2 and 3, at the opposite end of the drum is a backplate 16, with the port 25, also preferably located along the axis of drum rotation. More preferably, port 25 is also circular, with the center radius being on the drum axis of rotation. Cooperating with port 25 is a stationary cover plate 21 mounted on arms 43 which hold it adjacent the backplate 16. The port remains substantially closed at all times during composition heating, except at the time of, and to the extent necessary to allow composition to be recovered through the port. Composition recovery may be by any suitable method, the preferred means being illustrated in FIGS. 1 and 2 and comprising a chute 18 which is inserted into port 25. Chute 18 is preferably provided with a rack or track 22 cooperating with rachet assembly 20. A handle, or other drive means for the rachet will engage track 22, through appropriate gears or the like, to insert or retract the chute through the port.

Figure 6:
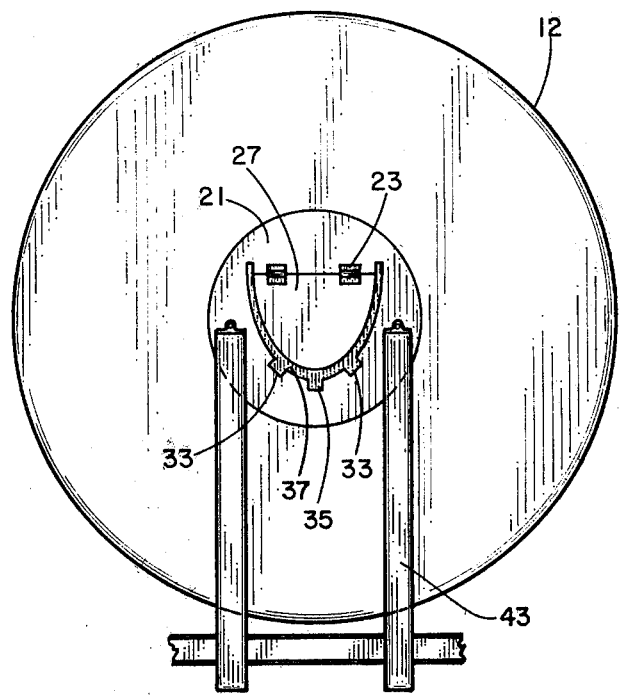
FIG. 6 is an outside end view of the drum showing a stationary plate and port cover.

A preferred stationary cover plate 21 is shown in FIGS. 2 and 6, which include a hinged gate 27 secured on the plate by hinges 23, or the like. The preferred cover plate also includes a mouth 37 for the chute 18, and guide slots 33 for receiving guide bars 17 on the chute, while a slot 35 receives track 22. The chute may also be guided by roller 45 (FIG. 1) or other appropriate means. Chute 18 is also preferably provided with an end wall 41 extending at a suitable angle and height so as to come to rest against plate 21, when the chute is fully retracted from the drum interior and in the normal inclined position for withdrawing product. Such a feature will prevent the end of the chute from being accidently withdrawn from the port when fully retracted.

At the opposite end of the drum is a burner 24 having nozzle 26 for introducing flame and hot gases of combustion into the drum through port 14. Again, with the opposite or product recovery end of the drum being substantially closed as previously described, exhaust gases, combustion gases from the hot asphalt, and gases of combustion are prevented from being vented through the drum end at port 25. Instead, substantially all of those gases must be vented through open port 14.

The improved crushing and feeding apparatus 30 of the invention is illustrated in FIG. 1 and comprises a cylinder 32 having attached a plurality of lugs 34 which have somewhat pointed ends for piercing pieces of asphaltic concrete. The cylinder is rotated by appropriate means such as a driven chain 35 while conveyor 36 advances pieces of asphaltic concrete toward the drum. As these pieces pass cylinder 32, they are forced against lugs 34 and become split into smaller pieces, which are then directed into trough 66 and feeder conveyor 68 and into the drum via port 14. This crushing and feeding apparatus 30 is optional, and any other suitable means may be used. However, that shown is quite suited to processing 100% asphaltic concrete through the drum because of its design, and the means by which it may be secured to a common frame or support 15. The apparatus shown simplifies the processing of asphaltic concrete having a great variety of chunk and particle sizes as normally taken up from a road, without the necessity of substantial additional crushing, sizing and conveying equipment. Such material may be loaded directly into hopper 60 for crushing, feeding and processing in the apparatus.

The interior of the drum is illustrated in FIGS. 2 and 3. Adjacent open port 14, and extending rearwardly along a substantial length of the drum are wedge or inverted V-type lifters 44 secured along the drum surface. These lifters, unlike trays, do not carry the composition upwardly as the drum rotates to an extent to create a substantial curtain of particles falling through the drum interior. Instead, these rib lifters allow the composition to become banked along the drum side and cascade downwardly along the banked composition surface so that the composition is heated from the surface exposure to the hot gases within the drum, rather than individual particles freely falling through the hot gases within the drum. Suitable rib lifters shown may be lengths of angle iron, or the like, secured along the drum interior to give an inverted V-shaped cross-section extending from the drum surface. These rib lifters extend a substantial distance along the drum interior from adjacent open port 14 to define a first portion of the drum.

A second portion of the drum adjacent backplate 16 and recovery port 25 is defined by shelf or tray lifters 42. In this second defined section of the drum, the composition particles are lifted to a substantially greater extent than in the first drum portion, whereby the particles are alternately lifted and dropped in the form of a curtain through the drum interior. However, because this second drum portion is at the opposite end from the open end into which flame and hot gases of combustion are introduced, the composition particles have been substantially heated by the time they reach the second portion, and are not as susceptible to burning by the hot gases. In the second section the particles are lifted and dropped through the hot gases, thereby allowing continuing and greater particle heating, to achieve product temperatures of at least about 225°, and often preferably about 275°–300° F. The particle curtain formation caused by the tray lifters 42 also provides an advantageous means for recovering the composition as chute 18 is inserted into the second drum portion. With the insertion of the end of chute 18 into the drum, the end of the chute will form a platform on which a number of the falling particles of the curtain will fall and be directed gravitationally along the chute and out of the port. Thus, the tray lifters 42 in the second drum section 46 not only act to further enhance heating efficiency of the drum, but provide, in cooperation with the chute, means for recovering composition. As shown, a portion of the tray lifters may include lips 39, and a portion of them not, the lipped trays simply holding the composition particles for a longer period before they drop gravitationally, as the drum is rotated.

As previously stated, in processing composition in the apparatus of the invention, substantially all gases from within the drum are vented to atmosphere through open port 14. This is accomplished by maintaining port 25 substantially closed. Observing particularly FIG. 2, with chute 18 in place, extending into the drum through port 25, gate 27 is closed, and cover plate 21 positioned close to backplate 16 so that only relatively small amounts of gas can escape to atmosphere at that end of the drum. Even as product is recovered by extending the chute into the drum, as the composition is drawn past the hinged gate, it will be displaced only enough to allow passage of the solid material.

Figure 5:
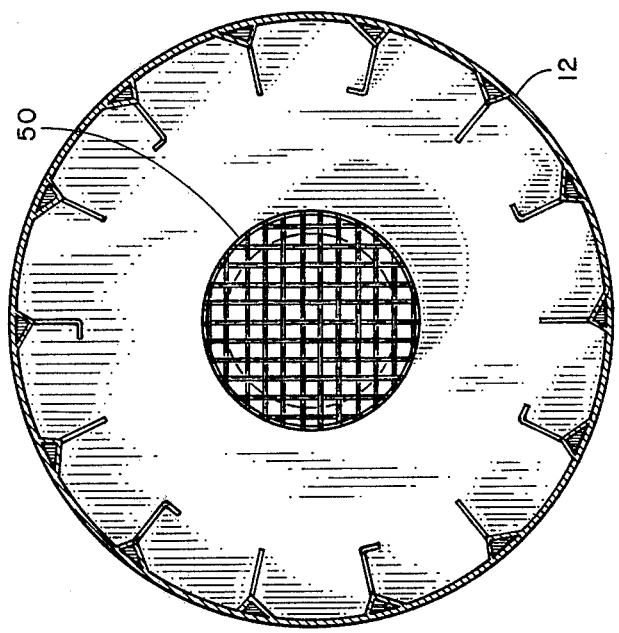
FIG. 5 is an end interior view showing the embodiment of FIG. 4.
Figure 4:
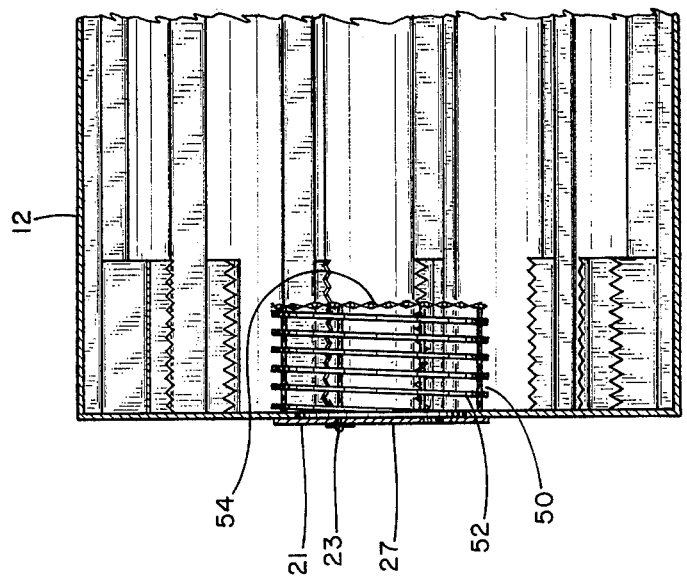
FIG. 4 is a view illustrating another embodiment of the composition recovery end of the drum.

Observing also FIGS. 4 and 5 there is shown another embodiment of the apparatus comprising a grid assembly 50 for avoiding larger particles or chunks from being recovered. A plurality of bars 52 provide a grid for limiting recovery of large particles. The bars may be spaced apart as desired. Preferably the bars are slanted so as to cause larger particles falling on the grid to be repelled back into the drum, as the grid rotates along with the drum. Screen 54 also prevents large particles from entering the grid interior, as well as in forming a sort of baffle to break up the hot gas stream projected into the drum by the burner.

Other modifications, within the scope of the invention, will be evident to those skilled in the art.

I claim:

1. Apparatus for recycling asphaltic concrete compositon comprising:
    a rotatable drum having a first port at a first end thereof open to atmosphere,
    a burner adjacent said first end for introducing hot gases of combustion into said first port,
    a second port at a second end of said drum having closure means for closing said second port,
    means for recovering composition from said second port, and
    wherein said closure means and said means for recovering composition cooperate to maintain said second port closed except to the extent necessary to recover composition therethrough, and whereby substantially all of said hot gases of combustion introduced into said drum are vented to atmosphere through said first port.

2. Apparatus of claim 1 wherein said drum is rotatable about an axis extending through said first and second ports.

3. Apparatus of claim 1 wherein said drum includes a first lifting means for elevating composition as the drum is rotated to prevent a curtain of composition particles passing through the hot gases of combustion in a first section of said drum adjacent said first port, and a second lifting means for elevating composition to form a curtain of composition particles in a second section of said drum adjacent said second port.

4. Apparatus of claim 3 wherein said first lifting means comprises a plurality of inverted V-shaped ribs extending along the drum interior surface substantially parallel to the axis of rotation.

5. Apparatus of claim 4 wherein said second lifting means comprises a plurality of trays.

6. Apparatus of claim 1 wherein said means for recovering composition comprises a retractable chute member for being selectively inserted into said drum through said second port.

7. Apparatus of claim 6 including a cover plate over said second port having a hinged gate secured thereto for maintaining said second port closed.

8. Apparatus of claim 1 including feed means adjacent said first port exterior from said drum for introducing composition into said first port concurrently with said hot gases of combustion.

9. Apparatus of claim 8 wherein said feed means comprises a conveyor apparatus and crushing means associated therewith for reducing the size of particles of asphaltic concrete.

10. Apparatus of claim 9 wherein said crushing means comprises a rotatable member having a plurality of protruberances thereon for breaking up said asphaltic concrete as it passes along said conveyor.

11. A process for recycling asphaltic concrete composition in a rotatable drum having a first port at one end thereof and a second port at the opposite drum end comprising:
introducing said composition into said first port,
introducing hot gases of combustion into said first port while rotating said drum, and closing said second drum port whereby substantially all of the exhaust gases in said drum are vented through said first port concurrently with the introduction of said hot gases of combustion therein.
heating said composition to a temperature of at least about 200° F., and
opening said second port to the extent necessary to recover the heated composition therethrough.

12. The process of claim 11 including inserting a chute into said second port to recover composition therethrough.

13. The process of claim 11 including exposing said composition to said hot gases in a first portion of said drum adjacent said first port in a manner preventing a curtain of particles of said composition in said first portion.

14. The process of claim 13 including exposing said composition to said hot gases in a second portion of said drum adjacent said second port in a manner forming a curtain of particles of said composition through said hot gases.

15. The process of claim 14 including inserting a chute through said second port and into said second section to recover composition therefrom.

* * * * *